United States Patent [19]

Cherukuri et al.

[11] Patent Number: 5,633,027
[45] Date of Patent: May 27, 1997

[54] CONFECTIONERIES CONTAINING STABILIZED HIGHLY ODOROUS FLAVOR COMPONENT DELIVERY SYSTEMS

[75] Inventors: Subraman R. Cherukuri, Towaco, N.J.; Gerald E. Battist, Reston; Jose F. Zamudio-Tena, Vienna, both of Va.

[73] Assignee: Fuisz Technologies Ltd., Chantilly, Va.

[21] Appl. No.: 475,963

[22] Filed: Jun. 7, 1995

Related U.S. Application Data

[62] Division of Ser. No. 286,286, Aug. 5, 1994, Pat. No. 5,556,652.

[51] Int. Cl.$^6$ .............................. A23L 1/221; A23G 3/00
[52] U.S. Cl. ............................. 426/96; 426/99; 426/650; 426/651; 426/660
[58] Field of Search ................................. 426/650, 651, 426/96, 99, 89, 660

[56] References Cited

U.S. PATENT DOCUMENTS

| | | |
|---|---|---|
| Re. 32,016 | 10/1985 | Esders et al. |
| 796,528 | 8/1905 | Pollock . |
| 816,055 | 3/1906 | Zoeller . |
| 847,366 | 3/1907 | Pollock . |
| 856,424 | 6/1907 | Robinson . |
| 1,489,342 | 4/1924 | Brent . |
| 1,541,378 | 6/1925 | Parcell . |
| 2,826,169 | 3/1958 | Le Veen . |
| 2,918,404 | 12/1959 | Mende et al. |
| 3,019,745 | 2/1962 | Du Bois et al. |
| 3,036,532 | 5/1962 | Bowe . |
| 3,067,743 | 12/1962 | Merton et al. |
| 3,070,045 | 12/1962 | Bowe . |
| 3,073,262 | 1/1963 | Bowe . |
| 3,095,258 | 6/1963 | Scott . |
| 3,118,396 | 1/1964 | Brown et al. |
| 3,118,397 | 1/1964 | Brown et al. |

(List continued on next page.)

FOREIGN PATENT DOCUMENTS

| | | |
|---|---|---|
| 609135 | 4/1988 | Australia . |
| 609137 | 4/1988 | Australia . |
| 900605 | 11/1977 | Belgium . |
| 1303511 | 4/1988 | Canada . |
| 0 287 488 A1 | 3/1988 | European Pat. Off. . |
| 0 387 950 A1 | 8/1990 | European Pat. Off. . |
| 86052 | 4/1988 | Israel . |
| 86053 | 4/1988 | Israel . |
| 88/2770 | 4/1988 | South Africa . |
| 88/2771 | 4/1988 | South Africa . |
| 89/9318 | 12/1989 | South Africa . |
| 90/2139 | 3/1990 | South Africa . |
| 90/8406 | 8/1991 | South Africa . |
| 519858 | 5/1971 | Switzerland . |
| 489211 | 7/1986 | Switzerland . |
| 2 155 934 B | 3/1985 | United Kingdom . |
| WO91/18613 | 5/1991 | WIPO . |

OTHER PUBLICATIONS

R.H. Doremus, "Crystallization of Sucrose From Aqueous Solution," *Journal of Colloid and Interface Science*, 104, pp. 114–120 (1985).

P. Bennema, "Surface Diffusion and the Growth of Sucrose Crystals," *Journal of Crystal Growth*, 3,4 pp. 331–334 (1968).

T.D. Simpson, et al., "Crystalline Forms of Lactose Produced in Acidic Alcoholic Media," *Journal of food Science*, 47, pp. 1948–1954 (1982).

A.D. Randolph, et al., "Continuous Sucrose Nucleation," *The International Sugar Journal*, pp. 8–12, 35–38, 73–77 (1974).

K.B. Domovs, et al., "Methanol–Soluble Complexes of Lactose and of other Carbohydrates," *J. Dairy Science*, 43, pp. 1216–1223 (1960).

ICI Americas, Inc., "ICI Americas Products for Cosmetics and Pharmaceuticals," (1977).

Domino Sugar Corporation, "Co–crystallization".
Domino Sugar Corporation, "Raspberry".
Domino Sugar Corporation, "Molasses Dark".

*Primary Examiner*—Jeanette Hunter
*Attorney, Agent, or Firm*—Hoffmann & Baron

[57] ABSTRACT

Solid delivery systems for highly volatile flavor oils which include a stabilized, substantially non-volatile mixture of a highly volatile flavor oil or flavor component and a medium chain triglyceride are disclosed. The stabilized mixtures may be absorbed or adsorbed onto a non-fat solid substrate and incorporated into a saccharide based matrix and flash flow processed. The delivery systems may be added to chewing gum and confectionery products.

14 Claims, No Drawings

OTHER PUBLICATIONS

| | | |
|---|---|---|
| 3,125,967 | 3/1964 | Bowe . |
| 3,131,428 | 5/1964 | Mika . |
| 3,308,221 | 3/1967 | Opfell . |
| 3,324,061 | 6/1967 | Tanquary et al. . |
| 3,482,998 | 12/1969 | Carroll et al. . |
| 3,523,889 | 8/1970 | Eis . |
| 3,557,717 | 1/1971 | Chivers . |
| 3,557,718 | 1/1971 | Chivers . |
| 3,595,675 | 7/1971 | Ash et al. . |
| 3,615,671 | 10/1971 | Schoaf . |
| 3,625,214 | 12/1971 | Higuchi . |
| 3,676,148 | 7/1972 | De Weese et al. . |
| 3,686,000 | 8/1972 | Lawrence . |
| 3,723,134 | 3/1973 | Chivers . |
| 3,749,671 | 7/1973 | Gedge et al. . |
| 3,762,846 | 10/1973 | Chivers . |
| 3,766,165 | 10/1973 | Rennhard . |
| 3,856,443 | 12/1974 | Salvi . |
| 3,875,300 | 4/1975 | Homm et al. . |
| 3,876,794 | 4/1975 | Rennhard . |
| 3,882,725 | 5/1975 | Rao et al. . |
| 3,902,351 | 9/1975 | Kreps . |
| 3,907,644 | 9/1975 | Möllering et al. . |
| 3,912,588 | 10/1975 | Möllering et al. . |
| 3,925,164 | 12/1975 | Beaucamp et al. . |
| 3,925,525 | 12/1975 | LaNieve . |
| 3,930,043 | 12/1975 | Warning et al. . |
| 3,951,821 | 4/1976 | Davidson . |
| 3,967,623 | 7/1976 | Butterworth et al. . |
| 3,972,725 | 8/1976 | Nicol . |
| 3,981,739 | 9/1976 | Dmitrovsky et al. . |
| 3,991,766 | 11/1976 | Schmitt et al. . |
| 3,992,265 | 11/1976 | Hansen . |
| 4,056,364 | 11/1977 | Dmitrovsky et al. . |
| 4,072,658 | 2/1978 | Okamoto et al. . |
| 4,086,418 | 4/1978 | Turbak et al. . |
| 4,090,920 | 5/1978 | Studer, Jr. . |
| 4,136,145 | 1/1979 | Fuchs et al. . |
| 4,153,512 | 5/1979 | Messner et al. . |
| 4,159,210 | 6/1979 | Chen et al. . |
| 4,160,696 | 7/1979 | Wu . |
| 4,164,448 | 8/1979 | Röeschlau et al. . |
| 4,166,005 | 8/1979 | Masurekar et al. . |
| 4,168,205 | 9/1979 | Danninger et al. . |
| 4,178,393 | 12/1979 | Gregersen . |
| 4,186,251 | 1/1980 | Tarbutton . |
| 4,194,063 | 3/1980 | Frank et al. . |
| 4,199,373 | 4/1980 | Dwivedi . |
| 4,241,178 | 12/1980 | Esders et al. . |
| 4,271,199 | 6/1981 | Cherukuri et al. . |
| 4,293,292 | 10/1981 | Israel . |
| 4,293,570 | 10/1981 | Vadasz . |
| 4,303,684 | 12/1981 | Pitchon et al. . |
| 4,335,232 | 6/1982 | Irwin . |
| 4,338,350 | 7/1982 | Chen et al. . |
| 4,348,420 | 9/1982 | Lynch et al. . |
| 4,362,757 | 12/1982 | Chen et al. . |
| 4,371,516 | 2/1983 | Gregory et al. . |
| 4,376,743 | 3/1983 | Dees . |
| 4,382,963 | 5/1983 | Klose et al. . |
| 4,382,967 | 5/1983 | Koshida . |
| 4,492,685 | 1/1985 | Keith et al. . |
| 4,496,592 | 1/1985 | Kuwahara et al. . |
| 4,500,546 | 2/1985 | Turbak et al. . |
| 4,501,538 | 2/1985 | Bray . |
| 4,511,584 | 4/1985 | Percel et al. . |
| 4,526,525 | 7/1985 | Oiso et al. . |
| 4,581,234 | 4/1986 | Cherukuri et al. . |
| 4,585,797 | 4/1986 | Cioca . |
| 4,619,833 | 10/1986 | Anderson . |
| 4,684,534 | 8/1987 | Valentine . |
| 4,722,845 | 2/1988 | Cherukuri et al. . |
| 4,747,881 | 5/1988 | Shaw et al. . |
| 4,765,991 | 8/1988 | Cherukuri et al. . |
| 4,772,477 | 9/1988 | Weiss et al. . |
| 4,793,782 | 12/1988 | Sullivan . |
| 4,797,288 | 1/1989 | Sharma et al. . |
| 4,816,283 | 3/1989 | Wade et al. . |
| 4,839,184 | 6/1989 | Cherukuri et al. . |
| 4,846,643 | 7/1989 | Yamamoto et al. . |
| 4,853,243 | 8/1989 | Kahn et al. . |
| 4,855,326 | 8/1989 | Fuisz . |
| 4,867,986 | 9/1989 | Desai et al. . |
| 4,871,501 | 10/1989 | Sugimoto et al. . |
| 4,872,821 | 10/1989 | Weiss . |
| 4,873,085 | 10/1989 | Fuisz . |
| 4,879,108 | 11/1989 | Yang et al. . |
| 4,882,144 | 11/1989 | Hegasy . |
| 4,885,281 | 12/1989 | Hanstein et al. . |
| 4,900,563 | 2/1990 | Cherukuri et al. . |
| 4,931,293 | 6/1990 | Cherukuri et al. . |
| 4,933,192 | 6/1990 | Darling . |
| 4,939,063 | 7/1990 | Tamagawa . |
| 4,978,537 | 12/1990 | Song . |
| 4,981,698 | 1/1991 | Cherukuri et al. . |
| 4,988,529 | 1/1991 | Nakaya et al. . |
| 4,997,856 | 3/1991 | Fuisz . |
| 5,004,595 | 4/1991 | Cherukuri et al. ............ 424/48 |
| 5,009,893 | 4/1991 | Cherukuri et al. . |
| 5,011,532 | 4/1991 | Fuisz . |
| 5,028,632 | 7/1991 | Fuisz . |
| 5,034,421 | 7/1991 | Fuisz . |
| 5,037,662 | 8/1991 | Poulose et al. . |
| 5,039,446 | 8/1991 | Estell . |
| 5,041,377 | 8/1991 | Becker et al. . |
| 5,057,328 | 10/1991 | Cherukuri et al. . |
| 5,066,218 | 11/1991 | Silver . |
| 5,073,387 | 12/1991 | Whistler . |
| 5,077,076 | 12/1991 | Gonsalves et al. . |
| 5,079,027 | 1/1992 | Wong et al. . |
| 5,082,682 | 1/1992 | Peterson . |
| 5,082,684 | 1/1992 | Fung . |
| 5,084,295 | 1/1992 | Whelan et al. . |
| 5,089,606 | 2/1992 | Cole et al. . |
| 5,094,872 | 3/1992 | Furcsik et al. . |
| 5,096,492 | 3/1992 | Fuisz . |
| 5,104,674 | 4/1992 | Chen et al. . |
| 5,110,614 | 5/1992 | Corbin et al. . |
| 5,164,210 | 11/1992 | Campbell et al. . |
| 5,169,657 | 12/1992 | Yatka et al. . |
| 5,169,658 | 12/1992 | Yatka et al. . |
| 5,171,589 | 12/1992 | Richey et al. . |
| 5,173,317 | 12/1992 | Hartman et al. . |
| 5,173,322 | 12/1992 | Melachouris et al. . |
| 5,175,009 | 12/1992 | Synosky et al. . |
| 5,196,199 | 3/1993 | Fuisz . |
| 5,236,734 | 8/1993 | Fuisz . |
| 5,238,696 | 8/1993 | Fuisz . |
| 5,266,335 | 11/1993 | Cherukuri et al. ............. 426/3 |
| 5,268,110 | 12/1993 | Fuisz . |
| 5,279,849 | 1/1994 | Fisz et al. . |
| 5,284,659 | 2/1994 | Cherukuri et al. ........... 424/441 |
| 5,286,513 | 2/1994 | Fuisz . |
| 5,288,508 | 2/1994 | Fuisz . |
| 5,306,955 | 4/1994 | Fryer . |
| 5,346,377 | 9/1994 | Bogue . |
| 5,348,758 | 9/1994 | Fuisz et al. . |
| 5,458,891 | 10/1995 | D'Amelia et al. ............. 426/5 |
| 5,505,982 | 4/1996 | Krawczyk ................. 426/660 |

CONFECTIONERIES CONTAINING STABILIZED HIGHLY ODOROUS FLAVOR COMPONENT DELIVERY SYSTEMS

This is a division of U.S. Ser. No. 08/286,286, filed on Aug. 5, 1994 now U.S. Pat. No. 5,556,652.

FIELD OF THE INVENTION

This invention relates to solid delivery systems for highly volatile flavor components and flavor oils for use in comestibles, such as gum and confectionery products, baked goods and other ingestible products. In particular, the present invention provides a means of making a stabilized, highly volatile flavor component-containing matrix for use in a variety of product applications.

BACKGROUND OF THE INVENTION

Many comestible products contain flavor oils and/or flavor components to provide the product with the desired taste and aroma, and to enhance the products' overall flavor perception in the mouth. Most flavors used in commercial applications are a complex mixture of compounds which have a particular taste and/or aroma associated with them. This generally holds true with respect to both natural and synthetic flavors and flavor components.

The volatility of flavor oils varies greatly, depending on the vapor pressures of the flavor components. Some of the more popular flavors, such as spearmint, peppermint, lemon, lime and cinnamon as well as numerous flavor components or compounds, such as menthol, benzaldehyde and camphor, are comprised of components which are extremely volatile, making them difficult to handle in manufacturing operations, as well as difficult to stabilize once they are incorporated into a product. For example, in the manufacture of chewing gum compositions and hard candies, volatile oils are generally one of the last ingredients to be added. This is because these confectionery compositions require mixing of the ingredients at temperatures which will quickly drive off the volatile components in the flavor oils. In cases where the flavor oils are particularly volatile, i.e., evaporate quickly at room temperature, such manufacturing processes merely add to the complexity of capturing all the flavor components in a given flavor oil. Certain flavor components and flavor oils are so highly volatile that they are very difficult to handle and give off intense odors. The loss of certain flavor components, i.e., the more volatile compounds in the flavor oil, results in a flavor perception which is otherwise altered from its intended taste and aroma characteristics. Thus, to capture the true characteristics of a particular flavor oil, it is necessary to substantially minimize or effectively eliminate the loss of these components.

Simple mixing procedures have proved to be ineffective in maintaining all the flavor components in the mixture. Additionally, spray drying procedures have proved impractical because very little flavor was retained in the dried product. This is due in part to the heat and air exposure involved in the process. Furthermore, conventional spray drying or spray congealing processes require the feed material to sit for relatively long periods, i.e. hours, in the liquid state while they are waiting to be pumped into the feedlines and subsequently sprayed. This waiting period creates a heat history which is deleterious to heat sensitive materials which may be present in the feed material, e.g. volatile flavor oils, heat sensitive sweeteners and pharmaceuticals. Furthermore, the conventional processes require dispersing agents to keep components in the molten mixture from settling out prior to and during pumping to the nozzle. More recently, however, it has been discovered that flavor oils can be flash flow processed using flash heat or flash shear methods. Flash flow processing is described in U.S. Ser. No. 08/205,026, filed Mar. 2, 1994; U.S. Ser. No. 08/081,338, filed Jun. 29, 1993; and U.S. Ser. No. 07/847,595, filed Mar. 5, 1992, commonly assigned to Fuisz Technologies, Inc., describes a method of providing a micronized oleaginous droplet in a saccharide-based matrix. Although flash flow processing has been found to be extremely effective in capturing the majority of flavor components during processing and protecting these components in the resultant matrices formed by the process, there is still a need to improve methods which prevent those especially high volatile components of the flavor oil from being lost.

It is apparent that there is a need for a method of handling and processing extremely volatile flavor oils and flavor components, as well as a product which maintains and delivers these materials without flavor loss.

SUMMARY OF THE INVENTION

The present invention is concerned with solid delivery systems for highly volatile flavor oils which include a stabilized, substantially non-volatile mixture of a highly volatile flavor oil or flavor component and a medium chain triglyceride. This mixture exhibits a substantially reduced vapor pressure and hence very little odor or volatility, notwithstanding the presence of highly volatile components. The incorporation of certain medium chain triglycerides in a mixture containing these oils is believed to be responsible for the stabilized, substantially non-volatile character of the mixture. This stabilized mixture allows for ease of handling of the highly volatile materials and facilitates the incorporation of these materials into a solid delivery system.

In addition, the medium chain triglyceride does not interfere with the taste or smell of a flavor as compared to many other oils, such as higher molecular weight triglycerides or fats, which contribute an adverse or undesirable taste component to the flavor system.

The stabilized, substantially non-volatile mixtures are combined with a saccharide-based matrix for use in comestibles, and preferably in chewing gum and confectionery products. In a preferred embodiment, the combination of the saccharide-based matrix and the stabilized, substantially non-volatile mixture is flash-flow processed to form a solid matrix having the stabilized, substantially non-volatile mixture united with the flash-flow-formed matrix. The stabilized, substantially non-volatile mixture of a highly volatile flavor component and medium chain triglyceride is a liquid. When combined with a solid saccharide-based material and subjected to flash flow processing, the resultant flash-flow-formed product is a solid saccharide-based matrix incorporating the liquid within the matrix. The resultant solid flash-flow-formed matrix further protects the highly volatile flavor oil and flavor oil components from volatilization. The combination of the stabilized mixture of medium chain triglycerides and highly volatile flavor oil and the flash flow process allows for incorporation of a higher amount of flavor oil in the final solid delivery system (flash-flow-formed matrix). Additionally, the final delivery systems have better flavor retention over time, i.e. less flavor loss due to the protective matrix, as well as a more uniform and consistent delivery of the flavor when incorporated into chewing gums, lozenges, hard candies and the like.

In another embodiment, the stabilized, substantially non-volatile mixture is absorbed or adsorbed onto a non-fat solid substrate. The substrate carries the stabilized mixture for use in food products, alone or in combination, with a flash flowable carrier material, such as a saccharide-based material. In such instances, the non-fat substrate having the stabilized, substantially non-volatile mixture absorbed/adsorbed thereon is added to a saccharide-based material and subjected to conditions of flash heat or flash shear.

In one particular embodiment, the stabilized, substantially non-volatile mixture is combined with a saccharide-based material and added directly to a chewing gum composition. In a more preferred embodiment of such products, prior to incorporation of this combination into the chewing gum composition, the stabilized flavor mixture/saccharide is subjected to flash flow processing. The resultant flash-flow-formed matrix is then incorporated into the chewing gum composition. In another embodiment of such products, the stabilized, substantially non-volatile mixture is absorbed/adsorbed onto a non-fat substrate and the resultant material is added to a saccharide-based matrix and either incorporated directly into the chewing gum composition or, in a preferred embodiment, subjected to flash flow processing prior to incorporation in the chewing gum product.

In another embodiment, the stabilized, substantially non-volatile mixture is added to a confectionery product such as a boiled candy. The stabilized mixture can be flash flow processed along with a saccharide-based material prior to incorporation into the candy or, as described above, absorbed or adsorbed onto a non-fat substrate prior to flash flow processing, and subsequently added to the candy composition.

The present invention also includes methods of stabilizing highly volatile flavor oils and flavor components by providing a mixture of these flavor oils and/or components and a medium chain triglyceride. This mixture is then combined with a saccharide-based material and either incorporated directly in a comestible product or subjected to flash flow processing prior to such incorporation.

In another embodiment of the present invention, the delivery systems are further combined with a fat material and flash flow processed to produce a solloid. Solloids are produced by methods described in copending U.S. Ser. No. 08/269,679, filed Jul. 1, 1994, the application being incorporated herein by reference. The production of solloids further enhances the protection and stabilization of the highly volatile oils and/or flavor components and, as described in the aforementioned application, allows for uniformity of distribution of the oils in each solloid.

The resultant solid, particulate flavor delivery system can be added to a chewing gum composition, confectionery product, oral hygiene product, pharmaceutical product or other food or personal products which require flavoring.

The term "flash flow" has become recognized in the art as referring the conditions of temperature and force required to transform a solid feedstock having a certain morphological and/or chemical structure to a new solid having a different morphological and/or chemical structure without subjecting the solids to heat history or other requirements inherent in extrusion processing. The term "flash flow" is described in co-owned U.S. Pat. No. 5,236,734, issued Aug. 17, 1993 and U.S. Pat. No. 5,238,696, issued Aug. 24, 1993, as well as co-pending U.S. Ser. No. 07/787,245 filed Nov. 4, 1991, U.S. Ser. No. 07/893,238, filed Jun. 30, 1992, U.S. Ser. No. 07/847,595, filed Mar. 5, 1992 and U.S. Ser. No. 099,200, filed Jul. 29, 1993.

The term "flash flow" refers to subjecting an appropriate feedstock to conditions of temperature and force which induce a solid feedstock to undergo rapidly such physical and/or chemical transformation. The time during the feedstock material is subjected to temperatures is very short. Flash flow processing can be accomplished either by a flash heat method or a flash shear method, as described further herein. In the flash heat method, the material subjected to temperature for generally only tenths of a second, whereas in the flash shear method the material is subjected to temperatures for a time on the order of seconds.

In the flash heat process, a shearform matrix can be formed by spinning a feedstock in a "cotton candy" fabricating type machine. The spinning machine used to achieve a flash heat process can be a cotton candy type machine, such as the EconoFloss Model 3017, manufactured by Gold Metal Products Company of Cincinnati, Ohio, a machine having a coiled heater element as disclosed in U.S. Ser. No. 954,257, filed Sep. 30, 1992 (herein incorporated by reference) and the like. It will be appreciated by those skilled in the art that any apparatus or physical process which provides similar forces and temperature gradient conditions can also be used. For simplicity in disclosing and describing this invention, the term flash heat will be understood to mean a process which a includes subjecting a feedstock to the combination of temperature, thermogradients, flow, flow rates and mechanical forces of the type produced in a candy machine or the above-referenced U.S. Ser. No. 964,257 application. The apparatus is operated at the temperature and speed which permits flash heat of the feedstock with deterioration of any of its ingredients.

In the flash heat process, the feedstock material is heated sufficiently to create an internal flow condition, i.e., intraparticle flow, which permits part of the feedstock to move at a subparticle level with respect to the rest of the mass and exit openings provided in the perimeter of the spinning head. The centrifugal force created in the spinning head flings the flowing feedstock material outwardly from the head so that it reforms with a changed structure. The force required to discharge flowable feedstock is provided by the forces which result from the spinning head. The flash heat process has been used to produce an amorphous matrix from a crystalline material, as disclosed in the aforementioned Fuisz patents. In the present invention, the feedstock comprises a combination of the stabilized, substantially non-volatile mixture and a saccharide-based material. The stabilized, substantially non-volatile mixture may be absorbed or adsorbed onto a non-fat substrate prior to incorporation into the flash flowable material.

Alternatively, the non-fat solid substrate having the stabilized, substantially non-volatile mixture associated therewith may be further incorporated into a solid fat, which is then subjected to heat and force sufficient to permit intraparticle flow of the fat. In this embodiment, the centrifugal force flings the feedstock material undergoing intraparticle flow into the air where the frictional forces provided by the ambient air disrupt the stream of such material, and lock the new morphological structure of the newly formed masses in place. The resultant product is the spheroidal-shaped solid suspension, i.e., a solid suspended in a solid, referred to herein as a "solloid."

In the flash shear process, a shearform matrix is formed by raising the temperature of the feedstock material, which includes a non-solubilized component, to a point where said component undergoes intraparticle flow. The non-solubilized component is preferably a fat which is solid at about room temperature. The feedstock is advanced and ejected from an extruder or similar type of machinery while the fat is undergoing intraparticle flow and is then subjected to disruptive fluid shear forces to form multiple parts or masses which comprise the individual spheroidal solloids.

The solloids are substantially cooled immediately after contact with the fluid shear force and are permitted to continue in a free-flow or free-fall condition, whereby they are further cooled to prevent individual solloids from adhering to each other and to maintain a free-flow condition. In addition to fats and other oleaginous materials, the feedstock material may also be a saccharide-based material or other flash shear processable materials.

It is important that the feedstock selected for the flash flow process have the ability to be processed without reliance upon dissolution. Furthermore, since highly volatile flavor oils and flavor components are present, it is important that these materials not be exposed to substantial heat for long periods of time. When fat-based materials are combined with the solid delivery system of the present invention, the feedstock is a solid material at room temperature, and is then subjected to the flash shear or flash heat process. No solvents or liquids are required in the present invention. The processes of the present invention are solid-to-solid processes which occur rapidly, with little or no heat history during processing.

The flash shear process can be carried out in an apparatus which has means for increasing the temperature of a non-solubilized feedstock and means for simultaneously advancing it for ejection. A multiple heating zone twin extruder can be used for increasing the temperature and advancing feedstock. The apparatus includes a means for ejecting the feedstock in a condition for shearing it to provide the shearform matrix. The means for ejecting is in fluid communication with the means for increasing the temperature and is arranged at the point to receive the feedstock while it is in the internal flow condition. The means for ejecting the feedstock is preferably a nozzle which provides sufficient frictional gas force applied to the ejected feedstock stream to disrupt the stream and form and maintain a solloid.

Apparatus for flash shear processing of the feedstock is described in co-pending U.S. Ser. No. 965,804, filed Oct. 23, 1992. The means for shearing is arranged proximally to the ejector and is disposed to effect the shear of the feedstock while it is in the internal flow condition. Preferably, the means for shearing is the means for delivering fluid such as air at sufficient velocity and at elevated temperature against the feedstock stream as it exits a nozzle. Such a device can be an external atomizing nozzle. The means for shearing can also be a chamber in which the environment can be maintained to induce shear upon the collision of a high velocity of a stream of feedstock directed against a preselected and maintained environment.

DETAILED DESCRIPTION AND PREFERRED EMBODIMENT

It is known that food stimulates the sense of smell, taste and touch. The interpretation and characterization of this stimuli is subjective and involves the combination smell and taste sensations which are usually expressed and described as flavor. The smell and taste functions are part of a complicated sensory ability which is stimulated by certain molecules. Compounds responsible for taste are predominantly part of the non-volatile portion of a flavor system which acts on the taste buds of the tongue or on the inner parts of the mouth. Compounds which are responsible for smell or odor are generally volatile molecules, which have been carried by the air stream into the upper nasal cavities where they trigger the neurons in the olfactory epithelium.

Typical verbal descriptors of odorous, i.e. volatile, compounds include expressions such as pleasant, flat, strong, sharp, mild and fresh as well as more precise expressions such as fruity, flowery, fatty, rancid, resinous, mouldy, and balsamic. Comparisons and associations are also commonly made. For example, flavors are also referred to as wax-like, nut-like, honey-like and so on. These verbal descriptions of the tonalities and characteristics represent the qualitative aspect of the odorous compounds. The qualitative aspect of a flavor is generally referred as its power, i.e., the threshold level at which a compound can be detected by sensory means, usually by 50% of an expert panel.

Of the total flavor sensation, many authorities believe that odor is more important than taste. For example, experience has shown that flavor sensation is marketedly reduced when the nasal passages are partially blocked, such as in the case of a common cold. The flavor may be referred to as tasting flat in such cases. In actuality, the taste buds are functioning but the odor component of the flavor is not perceived.

The odor component of flavor is made up of at least two vectors. One vector is called the absolute external odor or fundamental odor of a substance. This vector involves the perception, i.e., sniffing of a substance without contact with the tongue. That is, molecular vapors or gases of the flavor oil or flavor component pass directly to the olfactory sensory in the nasal passages. This vector is dependent upon the vapor pressure, i.e., volatility of the flavor oil or flavor oil component.

The other vector is often referred to by researchers as the internal odor, because the molecules reach the olfactory sensors by way of the pharynx, a flattened tubular passage that connects the back of the mouth with the nasal cavities. Additionally, in the mouth, food which contains flavor components is also combined with saliva, altering not only the vapor pressure of the flavorings present, but sometimes exposing more and different flavorings, thereby affecting the flavor intensity and quality.

It is known that extremely dry substances exhibit very little flavor and tend to be odorless. For example, the odor of metallic substances are often difficult to detect. Generally, however, the addition of small amounts of moisture to a product containing a flavor oil or flavor component increases their fundamental odor by increasing vapor pressure and activating the flavoring substances present. In the case of highly volatile flavor oils and flavor components, this in fact is even more dramatic. Thus, it is important to preserve as much of the true character of a particular flavor oil and/or flavor component by capturing and preserving substantially all of the volatiles in the flavor such that it can be delivered effectively in a comestible. Certain flavor oils are known to be extremely harsh or have bitter tones or notes. Additionally, certain flavors impart an extremely tense perception with very small amounts. In such cases, it is preferred to deliver small quantities of these oils. As previously mentioned, due to the high volatility of these oils, it is difficult to ensure that the proper quantities of oil are effectively transferred and maintained in the final comestible product. To compensate for this uncertainty, larger amounts of these oils are often incorporated during the manufacturing process to allow for normal vapor loss.

The present invention solves the difficulties in handling, manufacturing and maintaining comestible products which contain highly volatile oils. To achieve this goal, the present invention lowers the vapor pressure of highly volatile oils by combining them with a medium chain triglyceride to form a stabilized mixture. This mixture is substantially stable, has little or no aroma or odor, indicating that the volatility, i.e., vapor pressure, of the flavor oil and/or flavor oil component is substantially reduced. The stabilized mixture is then combined with a non-fat substrate and saccharide-based matrix and flash flow processed to yield a stable delivery system.

There are literally thousands of compounds which exhibit aromas. Flavors are generally composed of numerous compounds, each imparting a particular odor and taste. Natural flavorings usually come from a number of plant sources, such as bushes, herbs, shrubs, trees, weeds and specific parts of these substances. For example, arils, balsams, barks, beans, berries, blossoms, branches, buds, bulbs, calyxes, capsules, catkins, cones, exudates, flowering tops, flowers, fronds, fruits, gums, hips, husks, juices, kernels, leaves, needles, nuts, oils, oleoresins, peels, pits, pulps, resins, rhizomes, rinds, roots, seeds, shoots, stalks, stigmas, stolons, thallus, twigs, wood and wood sawdust, as well as entire plants, are examples of plant parts from which extracts are taken to use for or as flavors.

In addition to plant sources, some fundamental flavoring substances are also obtained from animal sources. These are relatively few, however. Musk deer is one such flavoring substance which is obtained from the secretion of the male deer of the Himalayan highlands. Bees wax, a cured yellow wax is often used to enhance the flavor and textural qualities of honey. Bees wax is also used in perfumery. It is known that there is a close link between the technology of flavorings for the food field and fragrances used in perfumes, cosmetics and related products.

For purposes of the present invention, highly volatile or odorous flavor oils and flavor components will mean those oils, components and compounds which alone or in admixture have a vapor pressure of at least 40 mm at temperatures of up to 160° C. and preferably having a vapor pressure of at least 40 mm at temperatures up to about 130° C. A partial listing of such highly volatile, odorous flavors and flavoring components includes:

| Flavor/Flavor Component | Temperature Required To Achieve 40 mm Vapor Pressure |
|---|---|
| Methyl Acetate | −7.9 |
| Ethyl Acetate | 9.1 |
| 1-Hexanol | 83.7 |
| Benzaldehyde | 90.1 |
| Benzyl Alcohol | 119.8 |
| 1-Octanol | 115.2 |
| 2-Octanol | 98 |
| Cinnamaldehyde | 152.2 |
| Cinnamyl Alcohol | 151 |
| Naphthalene | 140.1 |
| P-Cymene | 87 |
| Thymol | 139.8 |
| Camphene | 75.7 |
| d-Limonene | 84.3 |
| Myrcene | 82.6 |
| α-Pinene | 90.1 |
| β-Pinene | 71.5 |
| Terpenoline | 100 |
| Camphor | 114 |
| l-Dihydrocarvone | 123.7 |
| α-Citral | 135.9 |
| d-Fenchone | 99.5 |
| Pulegone | 121.7 |
| α-Thujone | 110 |
| d-Citronellal | 116.1 |
| Cineol | 84.2 |
| Dihydrocarveol | 136.1 |
| d,l-Fenchyl alcohol | 110.8 |

-continued

| Flavor/Flavor Component | Temperature Required To Achieve 40 mm Vapor Pressure |
|---|---|
| Geraniol | 141.8 |
| d-Linalool | 109.9 |
| α-Terpineol | 126 |
| l-Menthol | 126.1 |
| d-Bornyl Acetate | 123.7 |
| Goranyl Acetate | 150 |
| Linalyl Acetate | 127.7 |

The following flavor oils are known to be comprised of at least these components:

Lime Oil: α-P-Pinene, Camphene, β-Pinene, Myrcene, α-Phellandrene

Spearmint Oil: α-Pinene, β-Pinene, Thujan-4-ol, Myrcene, α-Terpinene

Lemon Oil: α-Thujene, α-Pinene, Camphene, Thujan-4-ol, β-Pinene

Cinnamon Oil: Benzaldehyde, β-Pinene, Cinnamaldehyde, Cinnamyl Alcohol

Peppermint Oil: α-Pinene, β-Pinene, Thujan 4-ol, Myrcene, α-Terpinene

Other flavor oils which may be useful in the present invention may be selected from a wide variety of natural or artificial oils or essences. These oils are generally derived from plant extracts, although they may alternatively be synthetically derived. Peppermint oil, spearmint oil, cinnamon oil, oil of wintergreen, menthol, citrus oils and other fruit essences are the most commonly used flavor oils which are employed in the present invention. The solid delivery system of the present invention give the perception that a greater quantity of flavor is present than the actual amount, thereby enhancing both the organoleptic impact with less flavor oil and eliminating the need for higher amounts of flavor oil or active. This is particularly useful in applications such as chewing gum compositions, where the addition of flavor oil at high concentrations to achieve a more intense flavor impact results in plasticization of the gum base components and sloppy chew characteristics. Additionally, flavor oils such as peppermint oil, spearmint oil, menthol and cinnamon oil are particularly harsh and create a burning sensation in the mouth if ingested in too high a quantity. The present invention allows for the use of smaller quantities than in typically comestible applications if desired, with the perception that greater quantities are present.

Alternatively, because the process allows for precision in the amount of active in the delivery system, higher loading of the active than in prior methods is possible. In essence, the processes of the present invention allow for precise control of the quantity of active in the delivery system.

Examples of citrus or fruit oils and/or essences which are useful include a host of materials such as apple, apricot, banana, blueberry, cherry, grape, grapefruit, lemon, lime, orange, pear, peaches, pineapple, plum, raspberry, strawberry and the like. Mixtures and derivatives of these materials are contemplated.

Additional flavoring agents may be chosen from synthetic flavor oils and flavoring aromatics, and/or oils, oleo resins and extracts derived from plants, leaves, flowers, fruits and so forth, and combinations thereof. For example, clove oil, bay oil, anise oil, eucalyptus oil, thyme oil, cedar leaf oil, oil of nutmeg, oil of sage, oil of bitter almonds and cassia oil may be used. Commonly used flavors include menthol, artificial vanilla, cinnamon derivatives, and various fruit flavors, whether employed individually or in admixture.

Flavorings such as aldehydes and esters including cinnamyl acetate, cinnamaldehyde, citral diethylacetal, dihydrocarvyl acetate, eugenyl formate, p-methylamisol, and so forth may also be used.

Further examples of aldehyde flavorings include, but are not limited to acetaldehyde (apple); benzaldehyde (cherry, almond), anisic aldehyde (licorice, anise); cinnamic aldehyde (cinnamon); citral, i.e., alpha citral (lemon, lime); neral, i.e. beta citral (lemon, lime); decanal (orange, lemon); ethyl vanillin (vanilla, cream); hellotropine, i.e., piperonal (vanilla, cream); vanillin (vanilla, cream); alpha-amyl cinnamaldehyde (spicy fruity flavors); butyraldehyde (butter, cheese); valcraldehyde (butter, cheese); citronellal; decannal (citrus fruits); aldehyde C-8 (citrus fruits); aldehyde C-9 (citrus fruits); aldehyde C-12 (citrus fruits); 2-ethylbutyraldehyde (berry fruits); hexenal, i.e., trans-2 (berry fruits); tolyl aldehyde (cherry, almond); veratraldehyde (vanilla); 2,6-dimethyl-5-heptenal, i.e. melonal (melon); 2,6-dimethyloctanal (green fruit); and 2-dodecenal (citrus, mandarin), mixtures thereof and the like.

Other specific flavor compounds such as ethylacetate, thiophene, ethylpropionate, ethyl butyrate, 2-hexanoate, 2-methylpyazine, heptaldehyde, 2-octanone, limonene, and eugenol are also useful.

The flavor oil content of the present delivery systems is generally in the range of about 0.02% to about 40% by weight of the delivery system. However, deviations from this range are certainly possible provided that the delivery system is formed using the flash flow process. Preferably, the oils are present in amounts of about 0.5% to about 30% by weight of the delivery system and most preferably about 2% to about 12%.

As previously mentioned, the addition of the medium chain triglyceride to the highly volatile flavor oil or flavor component results in a mixture which is highly stabilized, i.e., the volatility is substantially reduced such that very little evaporation occurs at room temperature. This is evident on a macro scale by the fact that little or not flavor odor is noticeable.

The stable, substantially non-volatile mixtures of the present invention, which include the medium chain triglyceride and the highly volatile flavor oil or flavor oil component, have a medium chain triglyceride content of about 0.1% to about 60%, and preferably 0.1% to about 20% by weight of the mixture. When present in these ranges, the medium chain triglyceride serves its valuable purpose as a vapor pressure lowering agent, which prevents premature and undesirable volatilization of highly volatile components.

The medium chain triglycerides of the present invention are selected from mono-, di- and polyhydric esters of a fatty acid, as well as mixtures thereof. Those fatty acids useful in forming the medium chain triglyceride have from 6 to 12 carbon atoms in the fatty acid chain. Non-limiting examples of fatty acids of this type are caprylic acid, capric acid, linoleic acid, caprioc acid, lauric acid, succinic acid and mixtures thereof. Preferably the medium chain triglyceride is the glycerol ester of these acids.

Specific examples of medium chain triglycerides useful in the present invention include those sold under the MIGLYOL® trademark by Hüls Aktiengesellschaft. There are various neutral, medium chain triglyceride oils marketed under the MIGLYOL® brand. For example: MYGLYOL® 810 is a medium chain triglyceride of fractionated $C_8$–$C_{10}$ coconut oil fatty acids and is classified as a caprylic/capric triglyceride. It has a higher caprylic acid content and a correspondingly lower capric acid content than MIGLYOL® 812, which is also a caprylic/capric triglyceride. MIGLYOL® 818 is a triglyceride of fractionated $C_8$–$C_{10}$ coconut oil fatty acids with a 5% portion of linoleic acid. It is classified as a caprylic/capric/linoleic triglyceride. MIGLYOL® 829 is a glyceryl ester of fractionated $C_8$–$C_{10}$ coconut oil fatty acids linked to succinic acid. It is classified as a caprylic/capric/diglyceryl succinate triglyceride. MIGLYOL® 840 is a propylene glycol diester of saturated vegetable fatty acids with $C_8$–$C_{10}$ chainlengths and is classified as a propylene/glycol/dicaprylate/dicaprate triglyceride.

In addition to the MIGLYOL® brand of medium chain triglyceride oils, other brands such as NEOBEE® M-5, a caprylic/capric triglyceride from Stepan Company, Maywood, N.J., and DIGEST™ 65, a medium chain triglyceride prepared from edible vegetable oil and having a minimum of 65% $C_8$ esters present, and have been found to be useful.

As previously pointed out, medium chain triglycerides have been used as stable lipid solvents for colors, flavors, vitamins, antioxidants, and pharmaceuticals. These low viscosity oils have also been used in confectionery products as anti-sticking and lubricating agents and for dust prevention for spices, seasonings and other dry mixes.

The preferred medium chain triglycerides of the present invention include the fractionated $C_8$–$C_{10}$ coconut oil fatty acids classified as caprylic/capric triglycerides.

As a preferred embodiment, the stabilized medium chain triglyceride/highly volatile flavor oil mixture is combined, absorbed or adsorbed onto a non-fat solid substrate. For purposes of this invention, the term "non-fat" solid substrate will mean materials which are generally not considered fats in themselves and which are capable of absorbing, i.e. imbibing, or adsorbing the flavor oils. For example, such materials include, without limitation, cellulosics, silicas, microcrystalline waxes, water-swellable gums, water-swellable mucilages, alginates, carageenans, tragacanth, starches, calcium and magnesium carbonate, titanium dioxide, zein and mixtures thereof.

The aforementioned mixtures may be imbibed by or adsorbed onto the non-fat solid substrate either by soaking, mixing or coating the substrate with the mixture of medium chain triglyceride and highly volatile flavor oil. The non-fat solid substrate further protects potential volatilization during the flash flow process. As previously mentioned, however, since the flash flow process has substantially little heat history and occurs extremely quickly, volatilization during the process is already substantially reduced over conventional food processing.

The non-fat solid substrates may be selected from a wide variety of materials. One limitation, however, is that the melting point of the material chosen for the non-fat solid substrate must be such that, if flash flow process is used, the non-fat solid does not melt during the flash flow process. This means that the melting point of the non-fat solid substrate must be beyond the flow point temperature of the solid fat. In cases where flash flow processing is not used, this limitation does not, however, apply.

Representative non-fat solid substrates include, without limitation, those materials which are adsorbent as well as absorbent. For example, cellulosic materials such as alkyl celluloses, hydroxyalkyl celluloses and hydroxyalkylalkyl celluloses are contemplated. These include methylcellulose, hydroxymethyl cellulose, hydroxyethyl cellulose, hydroxypropyl cellulose, hydroxyethylmethyl cellulose, hydroxypropylmethyl cellulose, hydroxybutylmethyl cellulose, cellulose esters and hydroxyalkyl cellulose esters. Cellulose acetylphthalate and hydroxypropylmethyl cellulose are among those useful. Additionally, carboxyalkyl celluloses and their esters, as well as carboxyalkylalkyl celluloses and their esters are also useful. One example is carboxymethyl cellulose.

Other non-fat solid substrates include water swellable gums and mucilages, algal polysaccharides, pectin and lignin. For example, karaya gum, acacia gum, tragacanth, sodium alginate, calcium alginate, carageenen and its salts, as well as mixtures thereof may be employed. Starches, including chemically and biologically modified starches are also contemplated as being useful. Calcium carbonate, magnesium carbonate and stearate and the like are also useful. Additionally, protein materials such as zein, sorghum and other prolamines may also be employed.

Various silicas and microcrystalline substances are also useful as the solid non-fat substrate. For example, silicas are well known for their ability to absorb or otherwise capture liquids and certain silicas are extremely porous in nature. For example, synthetic amorphous silica has been particularly useful since it has a unique combination of uniformity, chemical inertness, large surface area and porosity which makes it very adsorptive. These silicas are manufactured with precisely controlled surface area, porosity and particle size distribution. This makes them particularly useful in the inventive compositions. Commercially available silicas of this kind are sold under the trademarks SYLOID® and SYLOX® by W.R. Grace & Company, Baltimore, Md. These materials are specifically intended for conventional liquid dispersions and suspensions. However, they are also useful in the delivery systems of the present invention.

It is preferred that the non-fat solid substrate have mucoadhesive properties. This means that the substrate has an affinity for adhering to the mucosal membranes of the body, particularly in the mouth, such that the active can be either absorbed quickly or in the case of flavorants, perceived for long periods of time in the oral-cavity, since the active agents are carried by the substrate. These substrate materials adhere when subjected to the moist conditions of the mouth, largely because of their physical and chemical affinity to the mucosal membrane structure. The carboxyl and hydroxyl hydrophilic groups on the substrates, as well as other hydrophilic groups which may be present, are believed to be largely responsible for the affinity and adhesion of these classes of materials to the mucosal membrane. These materials also have the capability of being smooth and devoid of any unpleasant texture in the mouth. For this reason, their lubricous mouth-feel allows for them to be virtually imperceptible when bound to the mucosal surface, thereby allowing the active to be slowly released in the mouth, in the case of flavorants, or in the bloodstream in the case of drugs or medicaments which may also be included in the delivery systems of the present invention.

The preferred non-fat solid substrate of the present invention is hydroxypropylmethyl cellulose. This particular substrate has found to be especially useful in chewing gum compositions and other confectionery products.

One advantage of the present invention is that the highly volatile flavor or flavor component is in substantially the same proportion in the delivery system as it is in the stabilized mixture of medium chain triglyceride/flavor oil. This is particularly useful in dosage forms where the active content is critical.

Final dosage forms in which the delivery system may be present can be selected from any number of vehicles or dosage forms. For example, food products, medicaments, baked goods, pharmaceutical preparations, lozenges, capsules, nuggets, dentifrices, liquids and gels may be employed among others. When incorporated into chewing gum and confectionery compositions, the delivery systems are present in amounts of about 0.05% to about 30% by weight, and preferably about 0.1% to about 20% by weight of the total compositions. Other products may contain the delivery system in effective amounts required to perceive the desired effect. In the case where medicaments having adverse tastes are incorporated with the stable mixture, the flavors may be present in an amount such that the adverse taste is ameliorated.

Once prepared, the delivery systems may be stored for future use or formulated with conventional additives such as pharmaceutically acceptable carriers and confectionery ingredients to prepare compositions which offer a variety of textures to suit particular applications. Pharmaceutically acceptable carriers may be selected from a wide range of materials. Without being limited thereto, such materials include diluents, binders and adhesives, lubricants, disintregrants, colorants, flavorings, sweeteners and other miscellaneous materials such as buffers and adsorbents used to prepare a particular medicated composition. In addition, elixirs, and syrups whereby the solloids are suspended therein are also contemplated.

The present invention contemplates the inclusion of those sweeteners well known in the art, including both natural and artificial sweeteners. Thus, sweeteners may be chosen from the following non-limiting list; sugars such as sucrose, glucose (corn syrup), dextrose, invert sugar, fructose, and mixtures thereof; saccharin and its various salts such as the sodium or calcium salt; cyclamic acid and its various salts such as the sodium or calcium salt; the dipeptide sweeteners such as aspartame and alitame; chlorinated sugar derivatives such as sucralose; natural sweeteners such as dihydrochalcone; glycyrrhin; Stevia rebaudiana (Stevioside); and sugar alcohols such as sorbitol, sorbitol syrup, mannitol, xylitol, and the like. Also contemplated as a sweetener is the nonfermentable sugar substitute hydrogenated starch hydrolysate (lycasin) which is described in Re. U.S. Pat. No. 26,959. Also contemplated is the synthetic sweetener 3,6-dihydro-6-methyl-1-1,2,3-oxathiazin-4-one-2, 2-dioxide particularly the potassium (Acesulfame-K), sodium and calcium salts thereof as described in German Patent No. 2,001,017.7.

The sweeteners may be incorporated as the active agent, per se, i.e., flash flow processed with the non-fat solid or substrate to form a substrate/active combined solid, combined with the stabilized medium chain triglyceride/flavor oil as the active or incorporated directly in the fat matrix.

The delivery system can be incorporated in conventional chewing gum compositions. These compositions typically contain a sweetener, a gum base and a flavor. Additionally sources of flavor and/or sweetener can of course be combined with the solloid delivery system and incorporated in the chewing gum composition.

In the present invention, the flavor, sweetener and optionally acidulants can be incorporated into the delivery system. For example, in one embodiment a flavorant selected from the group consisting of flavor oils, sweeteners, food acids (also referred to as acidulants), and mixtures thereof may be united with the solid non-fat substrate. Preferably a mixture of all three are present. In another embodiment, one or more of the flavorant materials may additionally be incorporated into the solid fat matrix such that it remains in the solid fat portion of the solloid.

Chewing gum compositions incorporating the novel delivery systems have distinct advantages in terms of sustained flavorant perception. Due to the physical structure of the delivery system, the flavorant materials are protected during processing as well as in the bulk storage form subsequent to processing. Once incorporated into a chewing gum composition, the delivery system serves to protect the flavorants from other components in the chewing gum as well as preventing migration of the flavorant from the gum base onto the surface of the gum.

One particular advantage to the inventive delivery systems relates to their ability to sustain the flavor and sweetness perception of the chewing gum. The non-fat solid substrate preferably has a muco-adhesive property which serves to adhere the solloids to the mucous membranes of the mouth. The solloids slowly release their flavorant materials through a delayed hydradation process. The perception of flavor and sweetness is significantly increased due to the presence of the solloids in the mouth during mastication With regard to chewing gum compositions, the amount of gum base employed will vary greatly depending on various factors such as the type of base, consistency desired and other components used to make the final product. In general, amounts of about 5% to about 85% by weight of the final chewing gum compositions are acceptable, with amounts of about 15% to about 30% by weight being preferred. The gum base may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene, polyvinylacetate and mixtures thereof are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight of the gum base.

A variety of traditional ingredients such as plasticizers or softeners such as lanolin, stearic acid, sodium stearate, potassium stearate, glycerol triacetate, glycerin and the like, including, natural waxes, such as paraffin waxes and microcrystalline waxes may also be incorporated into the gum base to obtain a variety of desirable textures and consistency properties. In accordance with the invention, however, these ingredients may be reduced in amount or in some cases, may be eliminated entirely. When present, these individual additional materials are generally employed in amounts of up to about 15% by weight and preferably in amounts of from about 3% to about 10% by weight of the final gum base composition.

The chewing gum may additionally include the conventional additives of coloring agents such as titanium dioxide; emulsifiers such as lecithin and glycerol monostearate; additional fillers such as aluminum hydroxide, alumina, aluminum silicates; calcium carbonate, and talc and combinations thereof; and additional flavoring agents. These fillers may also be used in the gum base in various amounts. Preferably, the amount of fillers when used will vary from about 4% to about 35% by weight of the final chewing gum.

The amount of delivery system used in the chewing gum composition will largely be a matter of preference. It is contemplated that the delivery system will be included in amounts of from about 0.25% to about 40% by weight of the final gum composition, with amounts of from about 1% to about 30% being preferred, and amounts of from about 1% to about 20% being most preferred.

In addition to the inventive delivery system, the chewing gum composition may also optionally include one or more additional ingredients such as conventional saccharide-based bulking agents including sugars or sugar alcohols, flavor delivery systems, spray-dried flavors, liquid flavors, natural and/or artificial sweeteners and the like.

The chewing gum compositions of the present invention may be prepared by combining the water-insoluble gum base portion and the water-soluble flavor portion including the novel flavor delivery system according to conventional chewing gum processing techniques.

For illustrative purposes, a method of preparing the novel chewing gum compositions is as follows:

A suitable chewing gum base is first melted. Softeners and bulking agents such as sugars or sugar alcohols if desired may be added slowly with stirring thereafter. The inventive delivery system is then added and mixing is continued until a homogeneous mass is achieved. Optionally, additional flavor oils or spray dried flavors may be added as well. The mass may then be rolled, scored, dusted and wrapped in any manner known in the art.

With regard to the preparation of other types of comestibles, the inventive delivery system may also be added in a conventional manner. For example, in the case of pressed tablets, the delivery system may be dry blended with the remaining tablet ingredients and the mixture thereafter compressed into final tablet form. In the case of dentifrices, denture creams and cleansers, the products also benefit from incorporation of the delivery system in their formulations. In short, the matrix may be added to various comestibles in a manner similar to that which the skilled artisan currently uses to add conventional comestible ingredients.

In one particular embodiment, a micron-sized synthetic, amorphous silica has been used as the non-fat solid substrate for liquid actives. Using these materials, the stabilized, flavor oil/medium chain triglyceride mixture can be adsorbed onto their surfaces and into their pores and the added to the feedstock of matrix material to form the inventive delivery systems. In this manner, additional controlled release characteristics can be imparted to the delivery systems, as well as adding further stabilization and protective features to the oils against volatilization and oxidation. These silica compounds also have ionic and hydrogen bond affinity for certain flavor component chemical groups, which affinity serves to strengthen flavor retention and consequently allows for increased delayed release capabilities and stabilization characteristics.

Additional materials which can be used as carriers for the flavor oils prior to incorporation with the inventive delivery system include maltodextrins, such as spray-dried maltodextrin marketed under the tradename M100 (10 DE) by Grain Processing Corporation, Muscatine, Iowa, as well as agglomerated maltodextrin (10 DE) sold under the tradename Micropot Buds 1015A, by E. Staley Manufacturing Co., Decatur, Ill. These materials are also porous and allow for flavor retention. Polydextrose and microcrystalline cellulose are also useful in this regard, as are a number of other adsorbent materials.

EXAMPLES

The following examples serve to provide further appreciation of the invention, but are not meant in any way to restrict the effective scope of the invention.

Example One

A stabilized substantially non-volatile mixture of 15% by weight % a caprylic/capric triglyceride (MIGLYOL® 810) and 10% by weight of the highly odorous, highly volatile flavor component benzaldehyde was made. This stabilized mixture was added to maltodextrin (MALTRIN® M-365, Grain Processing Corporation) and flash flow processed using an Econo Floss cotton candy machine. The temperature and spinning head speed were set at levels sufficient to produce a solid flash-flow-formed matrix containing benzaldehyde. Low temperatures are, of course, preferred. The resultant solid delivery system was in the form of white flakes with substantially very little benzaldehyde fumes or odor being observable by smell.

Example Two

A stabilized, substantially non-volatile and odor free mixture of diacetyl (5% by weight) and a medium chain triglyceride of fractionated $C_8$–$C_{10}$ coconut oil fatty acids, i.e. caprylic/capric triglyceride, was made and added to maltodextrin (MALTRIN® M-365, 80% by weight). The combination was then added to an Econo Floss cotton candy machine and flash-flow-processed to form greenish yellow flakes which comprise the inventive delivery system. The delivery system was substantially odor free, indicating little or no volatization of the flavor oil component.

Example Three

The following delivery system was prepared by incorporation into a chewing gum composition.

| Delivery System A | % By Weight |
| --- | --- |
| Medium chain triglyceride | 7.5 |
| Non-fat solid substrate | |
| (a) starch | 10.0 |
| (b) hydroxypropylmethyl cellulose | 16.0 |
| (c) calcium carbonate | 10.0 |
| Menthol crystals | 7.50 |
| Flavor enhancer | 0.15 |
| Sorbitol | 6.00 |
| Emulsifier and other additives | 8.0 |
| Polydextrose | 34.85 |
| | 100.00 |

The above ingredients were admixed and flash-flow-processed to form a solid stabilized high volatile-containing delivery system having little or no odor.

The resultant delivery system was added to the following chewing gum composition.

| Chewing Gum Composition | % By Weight |
| --- | --- |
| Gum base | 24.894 |
| Sweetener (sugar alcohol)* | 57.310 |
| Lycasine | 2.686 |
| Calcium carbonate | 6.268 |
| Emulsifier | 0.304 |
| Glycerin | 0.501 |
| Spearmint oil (free) | 1.612 |
| Spearmint oil (spray dried) | 1.003 |
| Artificial Sweetener** | 0.156 |
| Delivery System A | 2.006 |
| | 100.000 |

*xylitol and lactitol
**aspartame and acesulfame-K

The chewing gum composition was prepared in accordance with the methods described herein. Chewing gum panels were conducted for sensory evaluation with respect to flavor intensity and flavor duration. The results of the panel demonstrated that chewing gum compositions using the delivery system of the present invention exhibited a continuum of uniform flavor throughout a period of 60 minutes or more. The chewing gum composition remained stable without observable loss of flavor volatiles or migration of the flavor oil from the delivery system into the remainder of the chewing gum composition.

Example 4

A stabilized, substantially non-volatile mixture of 15 grams of a medium chain triglyceride and 22.5 grams of menthol crystals was formed. To this mixture was added 0.45 grams of F, D and C Blue No. 1 H.T. Lake. A second mixture comprising 22.5 grams of polyethylene glycol (8,000 carbowax) with 12 grams of hydrogenated cottonseed oil was heated separately. An additional mixture of 129.6 grams of corn sugar solids (maltodextrose M-365), 45 grams of hydroxypropylmethyl cellulose, 1.5 grams of lecithin, 15 grams of calcium carbonate, 0.4 grams of capsicum, 30 grams of xylitol and 6 grams of sorbitol was formed. The separate mixtures were then combined and placed in a spinning machine having a 7" cable heater head with a 0.030" gap between heating cables. The mixture was then flash flowed to produce a delivery system containing menthol flavor crystals.

The delivery system was then added to a candy matrix. The matrix was prepared by mixing 220 grams of corn syrup 43° Baume (Cargill), 330 grams of granulated sugar and 145 ml of water. The candy matrix was heated to 300° F., poured into a cooling pan and permitted to sit for 2–3 minutes to achieve a pliable state. The delivery system containing the menthol flavor crystals was then added and mixed into the candy matrix. The matrix was allowed to fully cool and was then cut into small pieces for consumption.

What is claimed is:

1. A confectionery composition comprising:
   (i) a saccharide-based matrix; and
   (ii) a highly odorous flavor component delivery system comprising a non-fat solid substrate having imbibed therein or coated thereon a mixture of a highly odorous flavor oil component and a medium chain triglyceride.

2. The confectionery composition of claim 1 wherein the medium chain triglyceride has from 6 to 12 carbon atoms in the fatty acid chain.

3. The confectionery composition of claim 2 wherein the medium chain triglyceride is formed from a fatty acid selected from the group consisting of caprylic acid, apric acid, linoleic acid, caproic acid, lauric acid, succinic acid and mixtures thereof.

4. The confectionery composition of claim 2 wherein the highly odorous flavor component has a vapor pressure of at least about 40 mm at a temperature of about 160° C. or less.

5. The confectionery composition of claim 4 wherein the highly odorous flavor oil component is selected from the group consisting of methyl acetate, ethyl acetate, 1-hexanol, benzaldehyde, benzyl alcohol, 1-octanol, 2-octanol, cinnamaldehyde, cinnamyl alcohol, naphthalene, p-cymene, thymol, camphene, d-limonene, myrcene, α-pinene, β-pinene, terpenoline, camphor, 1-dihydrocarvone, α-citral, d-fenchone, pulegone, α-thujone, d-citronellal, cineol, dihydrocarveal, d,1-fenchyl alcohol, geraniol, d-linalool, α-terpineol, 1-menthol, d-bornyl acetate, goranyl acetate, linalyl acetate, and mixtures thereof.

6. The confectionery composition of claim 2 wherein said flavor delivery system further comprises a flavor oil selected from the group consisting of peppermint oil, spearmint oil, eucalyptus oil, cinnamon oil, menthol oil of wintergreen (methylsalicylate), citrus oils, fruit essences and mixtures thereof.

7. The confectionery composition of claim 1 wherein said non-fat solid substrate is selected from the group consisting of cellulosics, silicas, microcrystalline waxes, water-swellable gums, water-swellable mucilages, alginates, carageenans, tragacanth, starches, titanium dioxide, calcium carbonate, magnesium carbonate, zein and mixtures thereof.

8. The confectionery composition of claim 1 wherein said flavor delivery system is present in amounts of about 0.05% to about 30% by weight of the confectionery gum composition.

9. The confectionery composition of claim 1 wherein said medium chain triglyceride is present in amounts of about 0.1% to about 20% by weight of said mixture.

10. The confectionery composition of claim 1 wherein said non-fat solid substrate is present in said delivery system in amounts of about 0.1% to about 40% by weight.

11. The confectionery composition of claim 1 wherein said highly odorous flavor oil component is present in amounts of about 0.5% to about 30% by weight of said mixture.

12. The confectionery composition of claim 1 wherein said flavor component delivery system is formed by flash flow processing.

13. The confectionery composition of claim 12 wherein said flash flow process is a flash heat or flash shear process.

14. A delivery system for highly odorous flavor oils comprising a non-fat solid substrate having imbibed therein in or coated thereon a mixture of a highly odorous flavor oil and a medium chain triglyceride.

* * * * *